Patented Apr. 7, 1925.

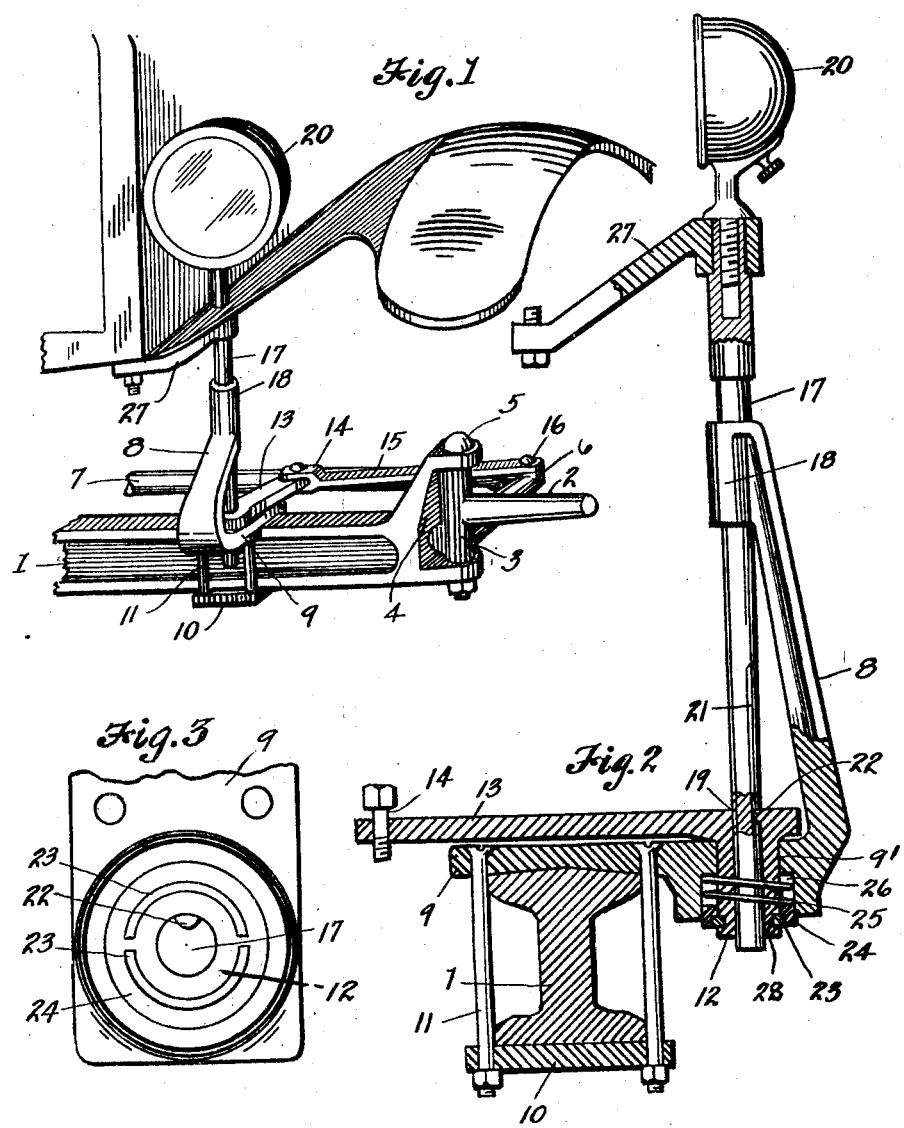

1,532,280

UNITED STATES PATENT OFFICE.

WILLIAM V. VAN ETTEN, OF EVERETT, WASHINGTON.

DIRIGIBLE HEADLIGHT.

Application filed April 8, 1924. Serial No. 704,918.

*To all whom it may concern:*

Be it known that I, WILLIAM V. VAN ETTEN, a citizen of the United States, and a resident of Everett, Snohomish County, Washington, have invented certain new and useful Improvements in Dirigible Headlights, of which the following is a specification.

My invention relates to improvements in dirigible headlights and searchlights, and more particularly to lights of that character for use on automobiles and similar vehicles and adapted to be controlled from the vehicle steering mechanism. This invention is an improvement on the device covered by Patent No. 1,471,635 issued to me on October 23, 1923.

It is the object of this invention to provide means whereby the direction of light cast from the headlights may at all times be automatically maintained in the direction of travel of the steering wheels of the vehicle.

More specifically it is the object of the invention to provide means for rotatably supporting a vehicle head and search light and to provide mechanism whereby the light supports are operatively connected with certain members of the vehicle's steering gear whereby the lights will be automatically rotated in accordance with the change of direction of the steering wheel of the vehicle, and also to provide a flexible construction that will withstand the shocks of the road and yet permit freedom of movement in the rotating parts without rattle.

Other objects of the invention reside in the details of construction, the preferred forms of which are illustrated in the accompanying drawings, wherein—

Figure 1 is a perspective view showing the dirigible lamp as mounted on the front axle of an automobile and its connection with the steering mechanism of the front wheels.

Figure 2 is a vertical section through the axle and lamp supporting parts.

Figure 3 is a view of the bottom of the lamp post bracket showing its retaining ring construction.

Referring more in detail to the drawings—

1 designates the front axle of an automobile which may be of any of the usual types, 2 the spindle of a steering knuckle 3; the latter being rotatably fixed between the arms of a yoke 4 at the ends of the axle by means of a vertical king pin 5.

The knuckle is controlled or steered by means of a rearwardly extending arm 6 that is connected pivotally at its rear end with a steering arm connecting rod 7, which in turn is connected with the steering wheel (not shown) whereby a driver may control the direction of travel of the vehicle.

The parts embodied by the present invention comprise a substantially vertical headlight or search light bracket 8, having a horizontally turned lower end forming a base plate 9 which overlies and is securely attached to the axle 1 by means of the bolts 11 extended therethrough and fixed in a plate that underlies the axle.

The base plate 9 has a circular opening 9' therethrough forwardly of the axle into which projects the hollow sleeve 12 formed on the under side of the headlight rotating lever 13. This lever horizontally overlies the axle and at its rearward end is pivotally attached by bolt 14 to one end of a connecting link 15 which at its other end is pivotally attached by bolt 16 to the steering knuckle arm 6.

A vertical shaft or post 19 with a lamp 20, rigidly mounted on the upper end thereof, is rotatably mounted within alined bearings in the bracket as at 18, and is fixed in the sleeve portion of the rotating lever at 19. This shaft has a groove 21 cut therein in which a stud 22 of the rotating lever is slidably engaged, thus permitting a slight vertical but no rotary movement of the shaft within the lever 13. In this manner and through the connections described any movement of the steering knuckle is communicated to the lamp which will accordingly be rotated in the same direction as the front wheels of the vehicle.

The rotating lever 13 has a groove 28 cut in the outer periphery of the lower end of the sleeve 12, in which fit the two sections of a retaining ring 23. This ring fits within a recess cut in the inner periphery of a ring 24 and holds the sections in place. The lower ends of the two rings are flush with one another and on the upper surface of the ring 24 rests a coiled spring 25, the upper coil of which is in contact with the base of a socket 26 formed in the underside of plate 9 about the sleeve and within which ring 24 is movably held. This construction permits of a vertical and rotary movement of the shaft and lever, holds the parts under spring tension to prevent rattling and at the same time permits assembling and dismounting of the parts without the use of tools. A small bracket 27, as shown in Figure 2, is rotatably secured to the shaft 17 and rigidly attached to the fender or adjacent part of the body in such way as to hold the shaft vertically in place without rattling against the fender opening. This bracket will have to vary in form with the type of car. This bracket will not be required on search lights with short shafts that do not pass through the fender.

It is evident that with the parts so constructed and assembled that the lights can be quickly, easily and securely attached, that they will absorb the shock of the road, be free from rattling noises and will turn with the vehicle steering mechanism.

In this manner the usual disadvantage resulting from the head and search lights being rigidly mounted on the vehicle frame is overcome, giving increased safety to the driver while making turns and to others who may be traveling in vehicles or on foot.

Having thus described my invention, what I claim as new therein and desire to secure by Letters Patent, is:

1. In a vehicle of the class described, the combination with the front axle and steering knuckle thereof, of a lamp supporting bracket rigidly fixed to the axle comprising a horizontal base plate and an upwardly directed standard; said base plate having an opening therethrough and said standard having a bearing vertically alined with the base opening, a lamp rotating lever overlying the base plate and having a sleeve bearing at one end extended rotatably through said base plate opening, a lamp supporting shaft rotatably mounted in the bearing of the standard and slidably keyed in said sleeve of the rotating lever, a locking ring fixed on the lower end of the sleeve and a spring bearing against said ring and base plate to yieldably retain the sleeve within the base plate opening, and a link pivotally connecting the rotating lever with the steering knuckle.

2. In a vehicle of the class described, the combination with an axle and steering knuckle mounted thereon, of a lamp supporting bracket comprising a horizontal base plate that is fixed rigidly to the axle and extending forwardly thereof and is then turned upwardly to form a substantially vertical standard; said standard having a bearing at its upper end and said base plate having an opening therethrough forwardly of the axle vertically alined with said bearing and opening into a socket of larger diameter formed concentrically therewith, in the under side of the base plate, a lamp rotating lever horizontally overlying the base plate and extended rearwardly of the axle having a sleeve bearing at its forward end extending downwardly and rotatably through said base plate opening and socket and having an annular groove in its lower end portion, a sectional locking ring fitted in said groove, a retaining ring vertically slidable in said socket and enclosing the sections of the locking ring, a coiled spring disposed in the socket to bear against the base thereof and against the retaining ring, a vertical lamp shaft rotatably contained in the standard bearing and slidably keyed at its lower end in the sleeve of the rotating lever, a lamp fixed to the upper end of the standard and an actuating link connecting the rotating lever and steering knuckle.

Signed at Everett, Snohomish County, Washington, this 29th day of March, 1924.

WILLIAM V. VAN ETTEN.